United States Patent [19]

Nagaraj et al.

[11] Patent Number: 5,450,249
[45] Date of Patent: Sep. 12, 1995

[54] DEMODULATOR CIRCUIT

[75] Inventors: Krishnaswamy Nagaraj, Wescosville, Pa.; Reza S. Shariatdoust, Califon, N.J.

[73] Assignee: American Telephone and Telegraph Company, New York, N.Y.

[21] Appl. No.: 64,528

[22] Filed: May 19, 1993

[51] Int. Cl.$^6$ .......................... G11B 5/09; G11B 5/02; G11B 5/596
[52] U.S. Cl. ...................... 360/46; 360/29; 360/51; 360/77.02
[58] Field of Search .............. 360/29, 46, 51, 77.08, 360/77.02; 329/315, 318, 321

[56] References Cited

U.S. PATENT DOCUMENTS

| | | | |
|---|---|---|---|
| 4,669,004 | 5/1987 | Moon et al. | 360/77.08 |
| 5,187,619 | 2/1993 | Sidman | 360/46 |
| 5,319,508 | 6/1994 | Tsunoda et al. | 360/46 |

*Primary Examiner*—Aristotelis Psitos
*Assistant Examiner*—Won Tae C. Kim

[57] ABSTRACT

A demodulator circuit receives an input signal read from a track of a magnetic medium and generates a control signal to maintain alignment of a read-write head with the track. The demodulator circuit includes at least one transistor. The at least one transistor has an electrode switchable between first and second voltage sources. The electrode is coupled to the second voltage source to block processing of the input signal. The electrode is coupled to the first voltage source to process the input signal. The at least one transistor provides an effective resistance when coupled to the first voltage source that is dependent on the voltage level of the first voltage source. The at least one transistor half-wave rectifies the input signal when the electrode is coupled to the first voltage source. In this manner, the at least one transistor provides an effective resistance when the electrode is coupled to the first voltage source, the magnitude of the effective resistance being determined by the voltage level of the first voltage source, half-wave rectifies the input signal, and simultaneously selects that portion of the input signal to rectify. Disk drive systems that utilize this technique have the advantage of at least one transistor simultaneously selecting the number of pulses to be integrated when turned on and blocking integration of the input signal when turned off, controlling the gain of an integrator by varying the resistance when turned on, and half-wave rectifying the incoming signal to vary the automatic gain control.

24 Claims, 3 Drawing Sheets

DEMODULATOR CIRCUIT

TECHNICAL FIELD

This invention relates generally to an integrated circuit employing one or more transistors as a variable resistor gain control in a half-wave rectifier and particularly to a demodulator circuit employing one or more transistors to simultaneously control gain, half-wave rectify a signal, and define the time period during which the half-wave rectification occurs, and systems utilizing such techniques.

BACKGROUND OF THE INVENTION

Concentric ring tracks are defined in the magnetic medium on disks. Data may be recorded on the tracks or previously recorded data may be read from the tracks. The width of a read-write head is coextensive with the spacing between adjacent tracks. With the read write head aligned with the centerline of a track, the read-write head extends half way to each adjacent track. A positioning circuit controls a read-write head servo drive mechanism to position the read-write head over a selected track. During a write operation, the read-write head must be precisely aligned with the selected track so that data written onto the disk is properly positioned on the disk relative to the track. During a read operation, the read-write head must also be precisely aligned with the selected track so that data read from the track is interpreted correctly. To assure precise alignment of the read-write head with the selected track, each track in an embedded servo implementation is segmented to include servo fields, with segments between the servo fields used for recording data. The servo field includes read-write head positioning information, which when read and demodulated, can be used to ascertain whether the read-write head is precisely aligned with a selected track or whether the read-write head needs to be repositioned to be precisely aligned with the selected track.

One technique used to evaluate alignment of a read-write head with the center of the track is a time division multiplexed technique. The relative amplitude of the read position field signals are employed to determine the position of the read-write head relative to a track. Up to four position fields are typical. The signal produced by the read-write head when reading the position fields are in the form of bursts. When four position fields are present they are often designated A, B, C, and D. Position fields A, B, C and D are located on each track at spaced intervals around the track. When the read-write head is aligned with the track, that is, aligned with the center line of the track, the A and B fields are read at half amplitude strength, the C field is read at full amplitude strength, and the D field is read at zero amplitude strength. A servo demodulator circuit is employed to derive the appropriate control action from the position field bursts.

Servo demodulator circuits are typically one of two types. The first type of demodulator circuit utilizes a peak detecting circuit. The peak detecting circuit compares the relative magnitudes of the amplitude of the A, B, C and D position field signals to determine whether the read-write head is aligned with the track. The second type of demodulator circuit is an integrating technique that demodulates position errors for improved linearity and reduced sensitivity to irregularities in the disk surface. These demodulator circuits have limited linearity that is inadequate for higher frequency operation.

It would be desirable to have a demodulator circuit that would accommodate wide variations in the signal received from the read-write head. Such a demodulator circuit would normalize the signal received from the read-write head to compensate for amplitude variations and the number of pulses per burst and simultaneously maintain speed and linearity.

SUMMARY OF THE INVENTION

A demodulator circuit receives an input signal produced by a read-write head reading from a track of a magnetic medium and generates a control signal to maintain alignment of a read-write head with the track. The demodulator circuit includes an integrator with at least one transistor that provides a gain-determining effective resistance. The at least one transistor has a gate electrode switchable between first and second voltage sources. The gate electrode is coupled to the first voltage source to alemodulate the input signal. The at least one transistor provides an effective resistance, when the gate is coupled to the first voltage source, that is dependent on the voltage level of the first voltage source. The at least one transistor half-wave rectifies the input signal when the gate electrode is coupled to the first voltage source. In this manner, the at least one transistor simultaneously provides an effective resistance to control integrator gain when the electrode is coupled to the first voltage source, half-wave rectifies the input signal, and selects that portion of the input signal to rectify. The gate electrode is coupled to the second voltage source at times when it is desired to block demodulation of the input signal. Disk drive systems that utilize this technique have the advantage of at least one transistor simultaneously selecting the number of pulses to be integrated when turned on and blocking integration of the input signal when turned off, controlling the gain of an integrator by varying the resistance when turned on, and half-wave rectifying the incoming signal to control the automatic gain control.

DETAILED DESCRIPTION

Figure 2:
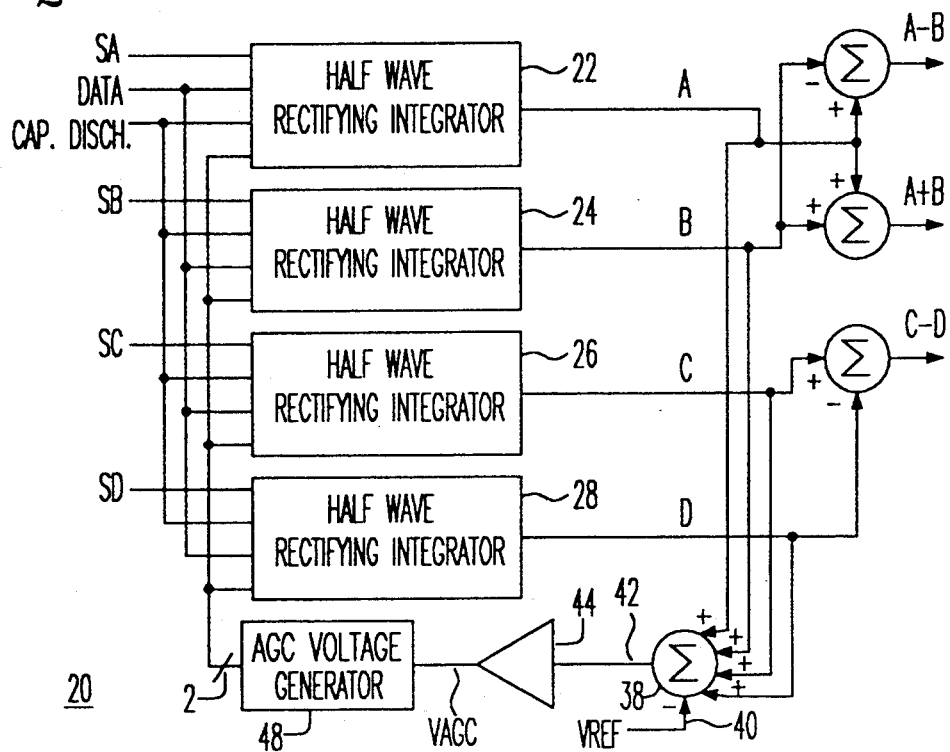
FIG. 2 is a circuit diagram of the servo demodulator circuit of an embodiment of this invention.

A servo demodulator circuit 20, as shown in FIG. 2, receives and demodulates a signal read by a read-write head from a track of a disk drive. The demodulator circuit half wave rectifies 22, 24, 26, and 28, and integrates 36 (FIG. 3), each of a plurality of field position signals A, B, C, and D to ascertain whether the read-write head is aligned with the track 12. The integrated sum of the field position signal bursts is compared to a voltage reference 40 at a summing junction 38 to generate an error 42. Integrator 44 integrates the error to provide an automatic gain control voltage VAGC that controls the gain of the integrator 36 for each field position signal, which in turn adjusts the integrated sum of the field position errors to reduce error signal 42.

Figure 1:
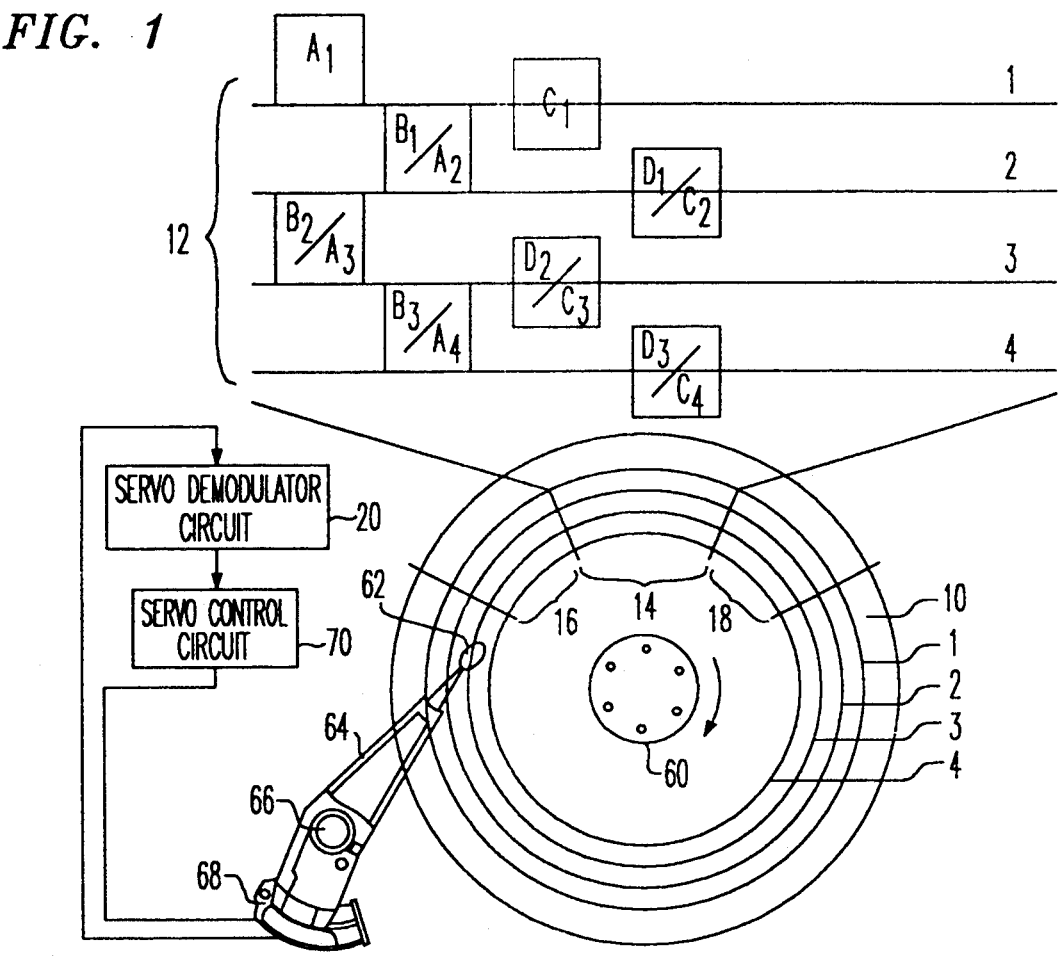
FIG. 1 is a diagram illustrating concentric tracks on the surface of a magnetic medium such as a disk.

More specifically, disk 10 is shown in FIG. 1 as having illustrative concentric tracks 1, 2, 3 and 4 which are representative of tracks 12. The servo field 14 of tracks 1-4 is also shown enlarged and illustrated as linear. In addition to servo field 14, tracks 12 include control field 16 and data field 18. At spaced locations along each track 12 are positioned fields A, B, C and D. As stated above, the number of position fields employed may vary. The subscript associated with each position field in FIG. 2 denotes the track affiliation. Field A is entirely on the first side of the center line of each track. Field B is entirely on a second, opposite side of the center line of the track. Field C spans a track center line extending half on each side and halfway to the adjacent track(s). Field D extends from halfway between a track and an adjacent track to the adjacent track. As can be seen in FIG. 1, some of the fields for one track are also associated with an adjacent track. The order of the A and B fields, as well as the order of the C and D fields, reverses for adjacent tracks.

When a mad-write head is aligned with a track center line, field A is read at half amplitude, field B is read at half amplitude, field C is read at full amplitude, and field D is not read. In addition, the difference between signals A and B is zero, the difference between C and D is unity, and the sum of A and B is twice A or, equivalently, twice B. When a read-write head is not aligned with the selected track, the field position bursts do not have the expected amplitude. The deviation from the expected amplitudes provide an error signal that is used to control repositioning of the read-write head over the center line of a track.

The disk drive system comprises a spindle 60 that includes means for rotating the disk 10. Read-write head 62 is mounted on an ann 64 that is pivotable about shaft 66. Means for positioning the read-write head over a selected track, such as a rotary voice coil 68, is provided. Demodulator circuit 20 is coupled to servo control circuit 70 to precisely reposition read-write head 62 over a selected track.

The read-write head signal is amplified by a preamplifier (not shown) and filtered by a low pass filter (also not shown) to remove noise. The filtered signal provides the input signal, designated DATA in FIG. 2, to the servo demodulator circuit 20. Servo demodulator 20 half-wave rectifies the input signal, adjusts the gain of substantially identical half-wave rectifying integrators 22, 24, 26 and 28, and integrates respectively the rectified A, B, C and D servo burst signals during timing windows defined by SA, SB, SC and SD, respectively. Servo demodulator 20 also generates normal servo signal A−B, the quadrature servo signal C−D, and the summed servo signal A+B. Fully balanced or differential circuitry may be used to maximize linearity, power supply rejection and signal handling capability. Although the circuit of FIG. 2 is not shown as a balanced circuit, those skilled in the art can readily fabricate a balanced circuit based on the schematic diagram of FIG. 2.

Figure 3:
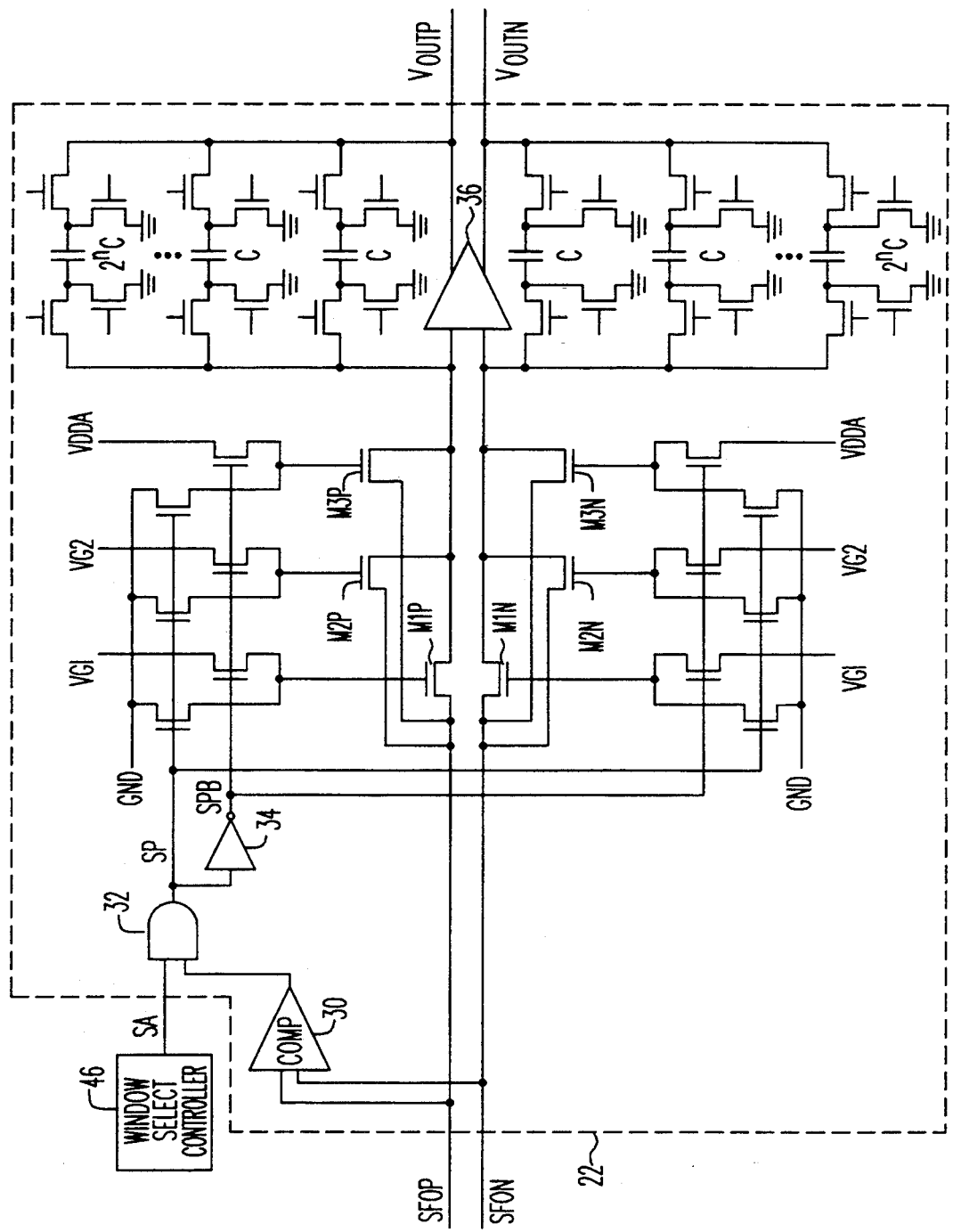
FIG. 3 is a schematic diagram of an integrator shown in FIG. 2.

Half-wave rectifying integrator 22 is typical of half wave rectifying integrators 22, 24, 26, and 28 and is shown in greater detail in the schematic diagram of FIG. 3. In FIG. 3, half-wave rectifying integrator 22 is shown as a fully balanced, or fully differential circuit. The DATA signal of Fig.2 is shown as differential input signals SFOP and SFON in FIG. 3. The difference between the differential input signals provides an input signal that is subjected to zero crossing detection by a high speed comparator 30. The output of comparator 30 is a logic signal representative of the polarity of the input signal. A comparator with fast rise and fall times as well as good resolution is important to achieve accurate integration. In a preferred embodiment, the negative half of the wave is integrated. Some hysteresis may be desirable to desensitize the comparator to small input signals.

Window select controller 46 provides an output window select signal SA which is a logic level signal. SA is high for the duration of the window of time over which half-wave rectifying integrator 22 is to operate as described in more detail below, and is otherwise low. The output, SP, of AND gate 32 is high when the output of comparator 30 is high and window select signal SA is high. The output of AND gate 32 is low at all other times. Inverter 34 generates signal SPB which is the inverse of signal SP. SPB is low when SP is high and is high when signal SP is low. Signals SP and SPB operate the switches, shown as field effect transistors, that control the selection of voltages applied to the gate electrode of transistors M1P, M2P, M3P, M1N, M2N, and M3N. Transistors M1P, M2P, M3P, M1N, M2N, and M3N in a preferred embodiment are metal oxide semiconductor field effect transistors.

When signal SP is high, the gate electrode of each of transistors M1P and M1N is coupled to voltage source VG1, the gate electrode of each of transistors M2P and M2N is connected to voltage source VG2, and the gate electrode of each of transistors M3P and M3N is connected to voltage source VDDA. Differential input signal SFOP passes through one or more transistors M1P, M2P and M3P as discussed in greater detail below and is integrated. Similarly, differential input signal SFON passes through one or more transistors M1N, M2N, and M3N before being integrated.

When the output of comparator 30 is low, or the window select signal SA is low, signal SP is low and the gate electrode of each of transistors M1P, M2P, M3P, M1N, M2N, and M3N is coupled to ground which blocks the input signal from reaching amplifier 36. As a result, half-wave rectifying integration is achieved with the half-wave rectifying integration occurring only during the time when the window select signal, SA, is high. More specifically, half wave rectifying integration occurs only when the output of AND gate 32 is high.

Operational amplifier 36 operates in a fully differential mode, has a high gain, wide bandwidth and fast settling time. Operational amplifier 36 is configured as an integrator with the effective resistance of transistors M1P(M1N), M2P(M2N) and M3P(M3N) providing resistance and capacitors, C, switched in or out of the circuit to give coarse gain selection. The capacitors are discharged at appropriate times between integrations by the CAP DISCH signal (shown in FIG. 2). Clocks to switch the capacitors may be derived from the SA, SB, SC and SD signals defining the respective integration windows. Those skilled in the art will readily fabricate circuits to achieve these functions. Once the coarse gain selection is complete, the number of capacitors employed remains constant. The gain of integrator 36 is adjusted by varying the effective resistance introduced by transistors M1P(M1N), M2P(M2N) and M3P(M3N) by the automatic gain control.

The range of control voltage has an upper bound of the supply voltage and a lower bound of the threshold or minimum voltage required to maintain the transistor operating in the linear region in presence of maximum input signal amplitude. A single transistor is thus limited to a range of resistance of about 3 to 1 as the gate voltage is varied from the supply voltage at the upper end to the threshold voltage that turns the transistor on at the lower end. In this application, it is desired to vary the resistance over a range of about 10 to 1to provide adequate gain adjustment to compensate for variations in signal amplitude, pulse width, process and temperature. Transistors M1P and M2P provide an extended range variable resistance with the transistors being turned on respectively by gain control voltages VG1 and VG2, in accordance with application Ser. No. 07/954,839 filed Sep. 30, 1992, entitled Multiple Control Voltage Generation for MOSFET Resistors, the disclosure of which is hereby incorporated by reference. An appropriate number of such transistors to produce the desired range of gain control may be employed.

The width to length ratio of the channels of transistors M1P(M1N) and M2P(M2N) are about one to a multiple of two or three. Both transistors M1P(M1N) and M2P(M2N) have a voltage, respectively VG1 and VG2, applied to the gate electrode simultaneously. When the applied voltage of voltage source VG1 exceeds the threshold voltage of transistor M1P(M1N), the effective resistance of transistor M1P(M1N) provides the resistance that determines the integrator gain. Voltages VG1 and VG2 are controlled, variable voltage sources. The voltage of VG1 is constructed to be of a larger magnitude than voltage VG2 to turn on transistor M1P(M1N) before turning on transistor M2P(M2N). When the applied voltage VG2 exceeds the threshold voltage of transistor M2P(M2N), the effective resistance of transistor M1P(M1N) is in parallel with the effective resistance of transistor M2P(M2N) and produces an equivalent effective resistance that determines the variable gain of the integrator. At low gate voltage, the resistance is high, which results in a high gain. As gate voltage is increased, the resistance is decreased, which in turn decreases the gain.

In a preferred embodiment, transistor M3P(M3N) is also provided. The source and drain electrodes of transistor M3P(M3N) are coupled to the source and drain electrodes of transistors M1P(M1N) and M2P(M2N). In this manner, the effective resistance of transistor M3P(M3N) is in parallel with the equivalent effective resistance of transistors M1P(M1N) and M2P(M2N). The width-to-length ratio of the channel of transistor M3P(M3N) is substantially smaller, such as about 20 times smaller, than the width-to-length ratio of the channel of transistor M1P(M1N). Transistor M3P(M3N) has its gate electrode coupled to ground when the gate electrodes of transistors M1P(M1N) and M2P(M2N) are coupled to ground. When signal SP is high, rather than the gate electrode of transistor M3P(M3N) being coupled to voltage source VG1 or VG2, as are the gate electrodes of transistors M1P(M1N) and M2P(M2N), the gate electrode of transistor M3P(M3N) is coupled to voltage source VDDA. Voltage source VDDA is a substantially constant voltage source such as the supply voltage. Transistor M3P(M3N) provides a large fixed resistance and thus a small fixed integrator gain that eliminates the gain fluctuation when the drain-to-source voltages of transistors M1P(M1ND and M2P(M2N) are small. By applying a fixed voltage such that at least a minimum gain is maintained by integrator 36, the integrator output variation due to noise on the automatic gain control voltage is minimized.

The automatic gain control compensates for variations in the integrated sum of the A, B, C and D signal bursts and variations in the signal burst pulse width at the fifty percent power level by summing the A, B, C and D bursts as best seen at summing junction 38 in FIG. 2. The servo demodulator circuit 20 compares the integrated sum to a voltage reference 40 to generate an error signal 42 that is the difference between the the reference voltage and the sum of the integrated bursts A, B, C and D. Deviation of the sum of bursts A, B, C, and D from the predetermined reference voltage 40 generates an error signal 42. Error signal 42 generated in servo demodulator circuit 20 is integrated by integrator 44 to generate an integrated error signal designated as automatic voltage gain control signal VAGC.

Figure 4:
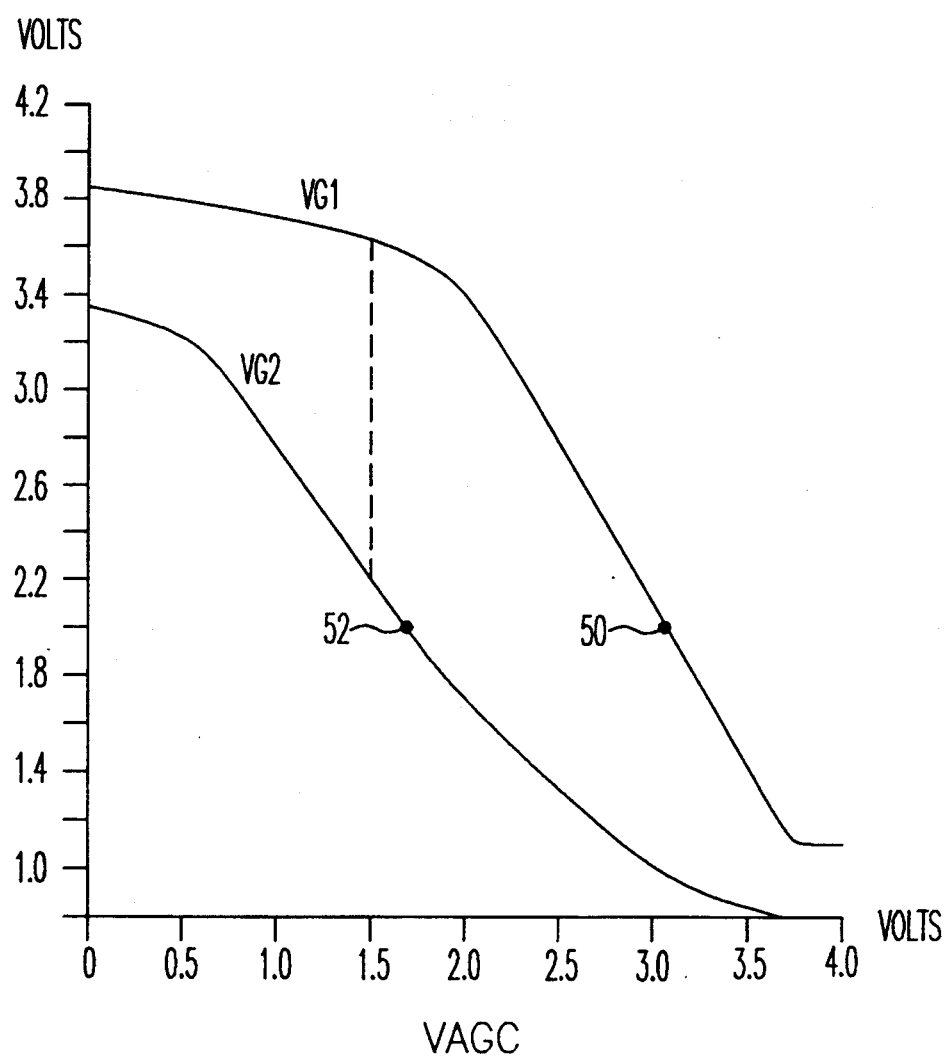
FIG. 4 is a diagram showing one possible relationship between automatic gain control voltage and two controlled voltages.

VAGC is the input voltage to automatic gain control (AGC) voltage generator 48. AGC voltage generator 48 receives the integrated error signal and generates voltages VG1 and VG2, as shown in FIG. 4, which are dependent on the integrated error signal. From point 50 to point 52, the voltage level of VG 1 increases and adjusts the effective resistance of transistor M1P(M1N) until the minimum resistance is approached. Over this voltage range, transistor M2P(M2N) is turned off as its threshold voltage has not been exceeded. As VAGC continues to decrease, voltage VG1 approaches a constant magnitude and voltage VG2 increases turning on transistor M2P(M2N). As voltages VG1 and VG2 vary, they in turn control the gain of integrator 36, thereby returning the integrated sum of bursts A, B, C, and D to the predetermined reference voltage 40 and reducing error signal 42 to zero. This provides automatic gain control to maintain the integrated sum of the A, B, C and D bursts constant. Circuits to achieve automatic gain control will vary depending upon the number of transistors employed to produce the desired range of gain control. For a single transistor, VAGC could be applied directly to the control transistor gate electrode without requiring AGC voltage generator 48. Automatic gain control circuits will be readily implemented by those skilled in the art.

Window select controller 46 produces a logic level window select signal, SA, that is high during the time when it is desired to integrate and is low at all other times. When SA is low, the differential input signals will be blocked from reaching amplifier 36 because SP is low and the gate electrode of each of transistors M1P(M1N), M2P(M2N), and M3P(M3N) is coupled to ground. For example, when integrating the negative half-wave, a window select controller generates a window select signal that transitions high before (or simultaneous with)commencement of integration, such as during the positive half cycle before integration is to commence. The window select signal transitions low after (or simultaneous with) completing integration of the desired number of negative half-wave cycles, such as during the positive half cycle following the last integrated negative half-wave cycle integrated. The number of negative half-wave cycles can be counted. Those skilled in the art can readily fabricate circuits to achieve these functions.

Half-wave rectifying integrators 24, 26 and 28 are substantially identical to half-wave rectifying integrator 22. The respective window select controllers are substantially identical in function to window select controller 46 but will define the respective window select signals SB, SC and SD to select and integrate the appropriate ones and number of half-wave cycles. The differential outputs from half-wave rectifying integrators 22, 24, 26, and 28 are combined as indicated in FIG. 2 to produce the normal servo signal, the quadrature signal, and the summed servo signal. These signals are used to control repositioning the read-write head.

In this manner, transistors M1P(M1N), M2P(M2N), and M3P(M3N) in servo demodulator circuit 20 simultaneously provide three functions. Firstly, the transistors switch on and off at times determined by window select controller, and more specifically by AND gate 32, thereby selecting the number of pulses of the differential signal to be integrated when turned on and blocked when turned off. Secondly, the transistors half-wave rectify the incoming signal by blocking the positive half of the differential input signal. Thirdly, the transistors provide automatic gain control to maintain the integrated sum of the position field bursts constant.

The illustrative embodiment of the invention is particularly useful in disk drive systems employing integrated circuits that utilize this technique. Such disk drive systems have the advantage of simultaneously providing the functions of selecting the number of pulses to be integrated when a transistor is turned on and blocking integration of the input signal when the transistor is turned off, half-wave rectifying the incoming signal, and controlling the gain of an integrator by varying the effective resistance of the transistor when turned on, and to vary the automatic gain control.

While the illustrative embodiment of the invention has been described as providing a half-wave rectification of the negative half of the differential input signals, the servo demodulator circuit could provide half-wave rectification of the positive half of the differential input signals, or full-wave rectification. For example, to achieve full-wave rectification the polarity of differential signals may be reversed each half cycle to provide the input to a single integrator. The illustrative embodiment of the invention has been described as providing logic level signals, such as the logic level signal produced by a zero crossing detector, that provides a logic high when the input signal is positive and a logic low when the input signal is negative. One skilled in the an could design a circuit to achieve the same function in which the logic slates differed from those in the illustrative embodiment.

We claim:

1. An integrated circuit including a demodulator for receiving an input signal, the demodulator comprising:
   an integrator having an input for receiving the input signal, the integrator for integrating the input signal to provide an integrated output signal; and
   at least one transistor, said at least one transistor coupled to the input of the integrator to provide an effective resistance for the input signal to pass through, said at least one transistor having a gate electrode;
   control circuitry, coupled to the gate electrode of said at least one transistor, for switching the gate electrode between first and second voltage sources, when the gate electrode is coupled to said first voltage source said at least one transistor adapted to:
   a) select a time period during which the input signal is integrated,
   b) provide an effective resistance to the integrator with the magnitude of the resistance being dependent on the voltage level of said first voltage source, and
   c) half-wave rectify the input signal to produce a half-wave rectified signal, and when the gate electrode is coupled to said second voltage source, said at least one transistor adapted to block integration of the input signal.

2. An integrated circuit as recited in claim 1, further comprising:
   a feedback circuit in which the voltage of said first voltage source is varied in response to the integrated output signal.

3. An integrated circuit as recited in claim 1, wherein said at least one transistor comprises a plurality of transistors each having a drain and a source, the drain of each of said plurality of transistors coupled together, and the source of each of said plurality of transistors coupled together, whereby the effective resistance of the transistors are coupled on parallel.

4. An integrated circuit as recited in claim 1, wherein the second voltage source is ground.

5. An integrated circuit as recited in claim 1, wherein the circuit is implemented in differential mode.

6. An integrated circuit including a demodulator for receiving an input signal, the demodulator comprising:
   an integrator having an input for receiving the input signal, the integrator for integrating the input signal to provide an integrated output signal; and
   at least one transistor, said at least one transistor coupled to the input of the integrator to provide an effective resistance for the input signal to pass through, said at least one transistor having a gate electrode switchable between first and second voltage sources, when the gate electrode is coupled to said first voltage source said at least one transistor adapted to:
   a) select a time period during which the input signal is integrated,
   b) provide an effective resistance to the integrator with the magnitude of the resistance being dependent on the voltage level of said first voltage source, and
   c) half-wave rectify the input signal to produce a half-wave rectified signal, and when the gate electrode is coupled to said second voltage source, said at least one transistor adapted to block integration of the input signal, whereby when the gate electrode is coupled to the first voltage source, said at least one transistor selects that portion of the input signal to rectify, provides an effective resistance, the magnitude of which is determined by the voltage level of the first voltage source, and simultaneously half-wave rectifies the
   input signal, to vary the voltage level of the first voltage source; and
   a further transistor, said further transistor having a gate electrode switchable between a predetermined voltage source and said second voltage source, the gate electrode of said further transistor adapted to be coupled to the predetermined voltage source when the gate electrode of said at least one transistor is coupled to said first voltage source, when the gate electrode of said further transistor is coupled to said predetermined voltage source said further transistor providing a large effective resistance in parallel with the effective resistance of said at least one transistor, whereby the further transistor provides a large effective resistance which in turn provides at least a minimum gain to the integrator when the gate of said further transistor is coupled to the predetermined voltage source.

7. A demodulator circuit for receiving an input signal, the demodulator circuit comprising:

a zero crossing detector for receiving the input signal and for determining the polarity of the input signal, the zero crossing detector providing a logic level output signal that is high when the input signal is positive and is low when the input signal is negative;

a window select controller for defining a time period over which half-wave rectification of the input signal should occur, the window select controller providing an output that is high during said time period and is low outside the time period;

an integrator having an input and providing an integrated output;

at least one transistor, said at least one transistor coupled to the input of the integrator to provide an effective resistance for the input signal to pass through, said at least one transistor having a gate electrode switchable between first and second voltage sources, said gate electrode adapted to be coupled to said first voltage source to provide an effective resistance to the integrator with the magnitude of the effective resistance dependent on the voltage level of said first voltage source, said at least one transistor half-wave rectifying the input signal to produce a half-wave rectified signal when the gate electrode is coupled to the first voltage source, the voltage level of said first voltage source being varied in response to the integrated output, said gate adapted to be coupled to said second voltage source to prevent integration of the input signal;

an AND gate for receiving as inputs the zero crossing detector output and the window select controller output, the AND gate providing an output that is high when both inputs are high, the AND gate output coupled to switch the switchable electrode of said at least one transistor to said first voltage source when high;

an automatic gain control circuit for receiving the integrated output from the integrator and for comparing the integrated output to a predetermined reference to determine the difference therebetween, the automatic gain control circuit varying the level of voltage of said first voltage source in response to the difference.

8. A demodulator circuit as recited in claim 7, wherein said at least one transistor comprises a plurality of transistors each having a drain and a source, the drain of each of said plurality of transistors coupled together, and the source of each of said plurality of transistors coupled together, whereby the effective resistances of the transistors are coupled in parallel.

9. A demodulator circuit as recited in claim 7, wherein the second voltage source is ground.

10. A demodulator circuit as recited in claim 7, wherein the demodulator circuit is implemented in differential mode.

11. A demodulator circuit as recited in claim 7, further comprising:

a further transistor, said further transistor having a gate electrode switchable between a predetermined voltage source and said second voltage source, the gate electrode of said further transistor adapted to be coupled to the predetermined voltage source when the gate electrode of said at least one transistor is coupled to said first voltage source, when the gate electrode of said at least one transistor is coupled to said first voltage source said further transistor providing a large effective resistance in parallel with the effective resistance of said at least one transistor, whereby the further transistor provides a large effective resistance which provides at least a minimum gain to the integrator when the gate of said further transistor is coupled to the predetermined voltage source.

12. A system for positioning a read-write head over a selected track of a magnetic medium on which data is capable of being stored or from which data is read, the system including a demodulator circuit, the demodulator circuit, comprising:

a zero crossing detector for receiving an input signal and for determining the polarity of the input signal, the zero crossing detector providing a logic level output signal that is high when the input signal is positive and is low when the input signal is negative;

a window select controller for defining a time period over which half-wave rectification of the input signal should occur, the window select controller providing an output that is high during said time period and is low outside the time period;

an integrator having an input and providing an integrated output;

at least one transistor, said at least one transistor coupled to the input of the integrator, said at least one transistor having a gate electrode switchable between first and second voltage sources, said gate electrode adapted to be coupled to said first voltage source to provide an effective resistance to the integrator with the magnitude of the effective resistance dependent on the voltage level of said first voltage source, said at least one transistor half-wave rectifying the input signal to produce a half-wave rectified signal when the gate electrode is coupled to the first voltage source, the voltage level of said first voltage source being varied in response to the integrated output, said gate adapted to be coupled to said second voltage source to prevent integration of the input signal;

an AND gate for receiving as inputs the zero crossing detector output and the window select controller output, the AND gate providing an output that is high when both inputs are high, the AND gate output coupled to switch the switchable electrode of said at least one transistor to said first voltage source when high;

an automatic gain control circuit for receiving the integrated output from the integrator and for comparing the integrated output to a predetermined reference to determine the difference therebetween, the automatic gain control circuit varying the level of voltage of said first voltage source in response to the difference.

13. A system as recited in claim 12, wherein said at least one transistor comprises a plurality of transistors each having a drain and a source, the drain of each of said plurality of transistors coupled together, and the source of each of said plurality of transistors coupled together, whereby the effective resistances of the transistors are coupled in parallel.

14. A system as recited in claim 12, wherein the second voltage source is ground.

15. A system as recited in claim 12, wherein the demodulator circuit is implemented in differential mode.

16. A system as recited in claim 12, further comprising:
 a further transistor, said further transistor having a gate electrode switchable between a predetermined voltage source and said second voltage source, the gate electrode of said further transistor adapted to be coupled to the predetermined voltage source when the gate electrode of said at least one transistor is coupled to said first voltage source, when the gate electrode of said at least one transistor is coupled to said first voltage source said further transistor providing a large effective resistance in parallel with the effective resistance of said at least one transistor and the gate electrode of said further transistor is coupled to said predetermined voltage source, whereby the further transistor provides a large effective resistance when said at least one transistor provides an effective resistance.

17. A system for positioning a read-write head over a selected track of a magnetic medium on which data is capable of being stored or from which data is read, the system comprising:
 a magnetic medium;
 means for rotating the magnetic medium;
 read-write head means for reading data from the magnetic medium or writing data to the magnetic medium;
 drive means for positioning the read-write head proximate a selected region of the magnetic medium; and
 a controller for controlling the position of the read-write head relative to the magnetic medium, the controller comprising an integrator having an input for receiving the input signal, the integrator for integrating the input signal to provide an integrated output signal, at least one transistor, said at least one transistor coupled to the input of the integrator for the input signal to pass therethrough, said at least one transistor having a gate electrode switchable between first and second voltage sources, when the gate electrode is coupled to said first voltage source said at least one transistor adapted to:
 a) select a time period during which the input signal is integrated,
 b) provide an effective resistance to the integrator with the magnitude of the resistance being dependent on the voltage level of said first voltage source, and
 c) half-wave rectify the input signal to produce a half-wave rectified signal,
 when the gate electrode is coupled to said second voltage source, said at least one transistor adapted to block integration of the input signal, whereby the controller provides a control signal to the drive means to position the read-write proximate a selected region of the magnetic medium.

18. A system as recited in claim 17, further comprising:
 a further transistor, said further transistor having a gate electrode switchable between a predetermined voltage source and said second voltage source, the gate electrode of said further transistor coupled to the predetermined voltage source when the gate electrode of said at least one transistor is coupled to said first voltage source, when the electrode of said further transistor is coupled to said predetermined voltage source said further transistor providing a large effective resistance in parallel with the effective resistance of said at least one transistor, whereby the further transistor provides a large effective resistance which in turn provides at least a minimum gain to the integrator when said at least one transistor provides an effective resistance.

19. A demodulator circuit for receiving an input signal, the demodulator circuit comprising:
 a plurality of half-wave rectifying integrator circuits, each of the integrator circuits having an integrator for integrating the input signal to provide an integrated output signal, at least one of said plurality of integrator circuits having a transistor, said transistor coupled to provide an effective resistance to the input of the integrator of said at least one integrator circuit for the input signal to pass through, said transistor having a gate electrode;
 control circuitry coupled to the gate electrode of said at least one transistor, for switching the gate electrode between an error voltage and another voltage source, when the gate electrode is coupled to the error voltage said transistor is adapted to:
 a) select a time period during which the input signal is integrated by the integrator to which the transistor is coupled,
 b) provide an effective resistance to the integrator with the magnitude of the resistance being dependent on the voltage level of said error voltage source, and
 c) half-wave rectify the input signal to produce a half-wave rectified signal, and when the gate electrode is coupled to said another voltage source, said transistor is adapted to block integration of the input signal by the integrator to which the transistor is coupled; and
 a summing junction for receiving the integrated output signals from the plurality of integrator circuits and for receiving a reference signal, the summing junction for comparing the sum of the integrated output signals to the reference signal and for producing the error voltage as the difference therebetween.

20. A demodulator circuit as recited in claim 19, further comprising an automatic gain control voltage generator interposed between the summing junction and the transistor gate, the automatic gain control voltage generator for providing a voltage signal to the transistor gate that is a function of the error voltage.

21. A demodulator circuit as recited in claim 19, further comprising:
 a further transistor, said further transistor having a gate electrode switchable between a predetermined voltage source and said another voltage source, the gate electrode of said further transistor adapted to be coupled to the predetermined voltage source when the gate electrode of said transistor is coupled to said error voltage, when the gate electrode of said transistor is coupled to said error voltage said further transistor providing a large effective resistance in parallel with the effective resistance of said transistor, whereby the further transistor provides a large effective resistance which provides at least a minimum gain to the integrator when the gate of said further transistor is coupled to the predetermined voltage source.

22. A method of demodulating an input signal received from a read-write head, comprising the steps of:
integrating the input signal in an integrator to provide an integrated output signal;
coupling an electrode of a first transistor to the input of the integrator to provide an effective resistance for the input signal to pass through, the first transistor having a gate electrode switchable between first and second voltage sources;
with the gate electrode coupled to the first voltage source,
  a) selecting a time period during which the input signal is integrated;
  b) providing an effective resistance to the integrator with the magnitude of the resistance being dependent on the voltage level of the first voltage source; and
  c) half-wave rectifying the input signal to produce a half-wave rectified signal; and
with the gate electrode of the first transistor coupled to the second voltage source, blocking integration of the input signal by the integrator.

23. A method of demodulating an input signal received from a read-write head, comprising the steps of:
integrating the input signal in an integrator to provide an integrated output signal;
coupling an electrode of a first transistor to thee input of the integrator to provide an effective resistance for the input signal to pass through, the first transistor having a gate electrode switchable between first and second voltage sources;
with the gate electrode coupled to the first voltage source,
  a) selecting a time period during which the input signal is integrated;
  b) providing an effective resistance to the integrator with the magnitude of the resistance being dependent on the voltage level of the first voltage source; and
  c) half-wave rectifying the input signal to produce a half-wave rectified signal;
with the gate electrode of the first transistor coupled to the second voltage source, blocking integration of the input by the integrator; and
varying the voltage level of the first voltage source in response to the integrated output signal.

24. A method of demodulating an input signal received from a read-write head, comprising the steps of:
integrating the input signal in an integrator to provide an integrated output signal;
coupling an electrode of a first transistor to the input of the integrator to provide an effective resistance for the input signal to pass through, the first transistor having a gate electrode switchable between first and second voltage sources;
with the gate electrode coupled to the first voltage source,
  a) selecting a time period during which the input signal is integrated;
  b) providing an effective resistance to the integrator with the magnitude of the resistance being dependent on the voltage level of the first voltage source; and
  c) half-wave rectifying the input signal to produce a half-wave rectified signal;
with the gate electrode of the first transistor coupled to the second voltage source, blocking integration of the input signal by the integrator;
coupling source and drain electrodes of a second transistor in parallel with electrodes of the first transistor, the second transistor having a gate electrode switchable between a predetermined voltage source and said second voltage source; and
coupling the gate electrode of the second transistor to the predetermined voltage source when the gate electrode of the first transistor is coupled to said first voltage source to provide a large effective resistance in parallel with the effective resistance of said first transistor, whereby the second transistor provides a large effective resistance which in turn provides at least a minimum gain to the integrator when the gate of the second transistor is coupled to the predetermined voltage source.

* * * * *